United States Patent
Stephens et al.

(10) Patent No.: US 9,019,915 B2
(45) Date of Patent: Apr. 28, 2015

(54) CHANNEL SELECTION TO MINIMIZE IMPACT ON EXISTING NETWORKS

(75) Inventors: Adrian Paul Stephens, Cambridge (GB); Michelle X. Gong, Sunnyvale, CA (US); Eldad Perahia, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 211 days.

(21) Appl. No.: 13/534,211

(22) Filed: Jun. 27, 2012

(65) Prior Publication Data

US 2014/0003353 A1  Jan. 2, 2014

(51) Int. Cl.
*H04W 72/04* (2009.01)
*H04W 72/02* (2009.01)
*H04L 5/00* (2006.01)

(52) U.S. Cl.
CPC .......... *H04W 72/0453* (2013.01); *H04W 72/02* (2013.01); *H04L 5/001* (2013.01); *H04L 5/0033* (2013.01); *H04L 5/0044* (2013.01); *H04L 5/0073* (2013.01)

(58) Field of Classification Search
CPC . H04W 84/12; H04W 72/0453; H04W 16/14; H04W 24/00; H04W 28/26; H04W 52/143; H04W 52/367; H04W 52/40; H04W 72/02; H04W 72/082; H04W 76/02; H04W 84/18; H04W 88/08; H04W 16/04; H04W 28/04
USPC .......................................................... 370/329
See application file for complete search history.

(56) References Cited

U.S. PATENT DOCUMENTS

| | | | | |
|---|---|---|---|---|
| 7,075,906 | B2 * | 7/2006 | Douglas et al. | 370/328 |
| 8,351,865 | B2 * | 1/2013 | Chu et al. | 455/69 |
| 8,687,583 | B2 * | 4/2014 | Noh et al. | 370/329 |
| 2007/0149230 | A1 * | 6/2007 | Song et al. | 455/515 |
| 2009/0067403 | A1 * | 3/2009 | Chan et al. | 370/343 |
| 2011/0205998 | A1 * | 8/2011 | Hart et al. | 370/330 |
| 2012/0052900 | A1 * | 3/2012 | Liu et al. | 455/515 |
| 2012/0069746 | A1 * | 3/2012 | Park | 370/252 |
| 2012/0113806 | A1 * | 5/2012 | Gong et al. | 370/230 |
| 2012/0157151 | A1 * | 6/2012 | Chu et al. | 455/522 |
| 2012/0176974 | A1 * | 7/2012 | Abraham et al. | 370/329 |
| 2012/0213204 | A1 * | 8/2012 | Noh et al. | 370/331 |
| 2012/0327870 | A1 * | 12/2012 | Grandhi et al. | 370/329 |

* cited by examiner

*Primary Examiner* — Edan Orgad
*Assistant Examiner* — Emmanuel Maglo
(74) *Attorney, Agent, or Firm* — Forefront IP Lawgroup, PLLC

(57) ABSTRACT

This document discloses one or more systems, apparatuses, methods, etc. for implementing an algorithm to enhance channel allocation and/or channel location selection in a wireless connection environment.

30 Claims, 8 Drawing Sheets

CHANNEL SELECTION TO MINIMIZE IMPACT ON EXISTING NETWORKS

BACKGROUND

Before wireless communication networks, setting up a computer network in a business or residential area often required running cables through walls and ceilings in order to deliver network access to all of network-enabled devices. With the creation of a wireless Access Point (AP), network users may be able to add the network-enabled stations (STAs) or devices that access a network with few or no cables. The AP may support one or more standards or specifications for sending or receiving data using radio frequencies. The Institute of Electrical and Electronics Engineers or IEEE provides standards such as, IEEE 802.11 that may define frequencies of the AP.

Despite recent technologies to improve performance of wireless communications networks, to be on par with wired communications networks, interference may still be a problem affecting system throughput. For example, access points (APs), together with associated STAs (e.g., laptop computers, tablet computers, smart phones, etc.) may reside in a multiple Basic Service Set (BSS). The BSS is a basic building block of 802.11 Wireless Land Area Network (WLAN). In this example, overlapping primary and/or secondary channel locations may impact operations between the APs. The impact may include interference that may cause severe congestion and instability in the wireless communications network.

Figure 1:
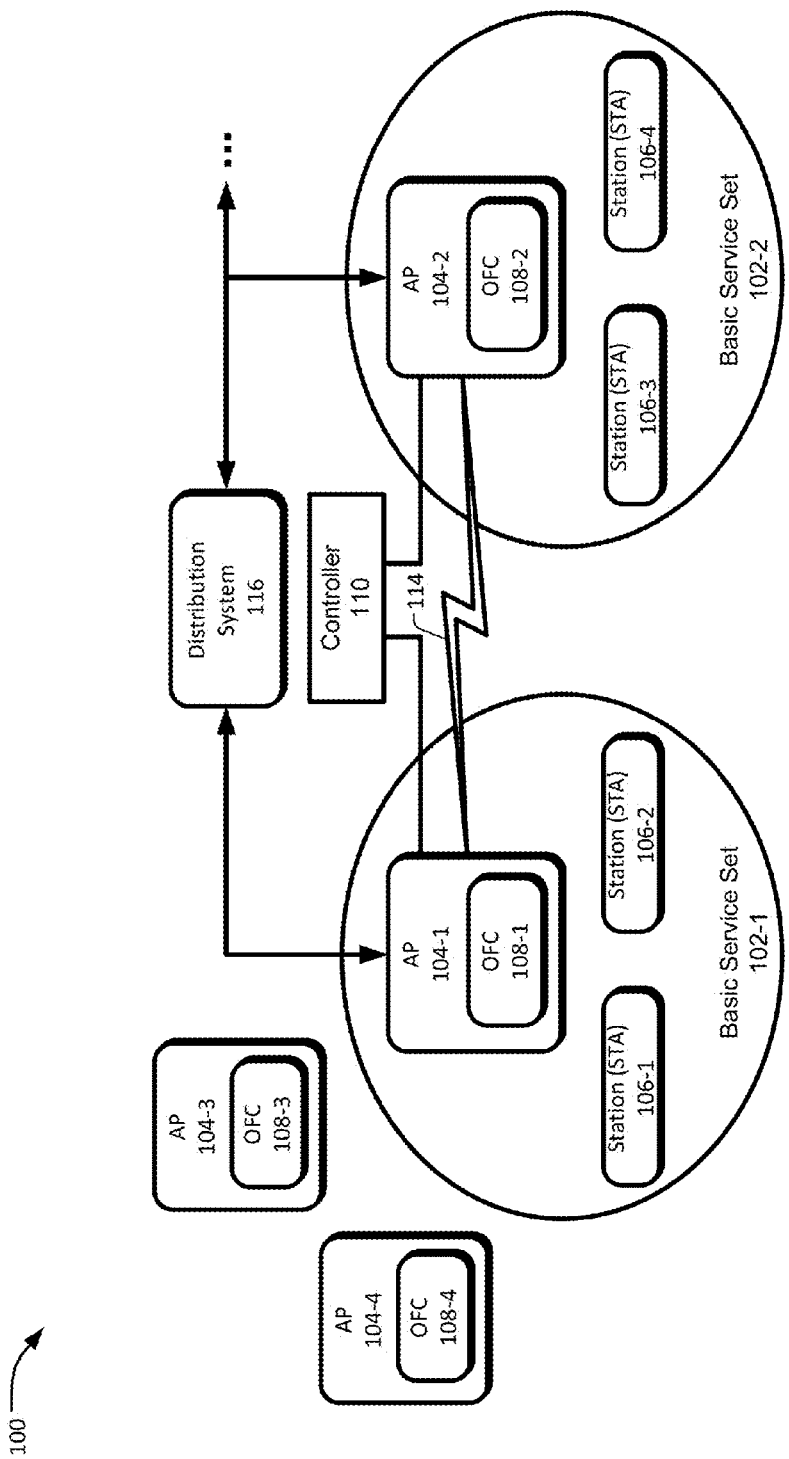
FIG. 1 is a block diagram illustrating an example system implementing an environment that adopts Institute of Electrical and Electronics Engineers or IEEE 802.11ac standard.

The following Detailed Description is provided with reference to the accompanying figures. In the figures, the leftmost digit(s) of a reference number usually identifies the figure in which the reference number first appears. The use of the same reference numbers in different figures indicates similar or identical items.

DETAILED DESCRIPTION

This document discloses one or more systems, apparatuses, methods, etc. for implementing an algorithm to enhance channel allocation and/or channel location selection in a wireless connection environment. In an implementation, such as in a distribution system network, a controller may run a centralized channel assignment algorithm, and assigns all operating frequency channels to access points (AP) in the distribution system network based on a rule described in embodiments below. For example, a first access point (AP) in the distribution system network may discover an existing operating frequency channel of at least one new AP that is in radio range of the first AP. In this example, the at least one new AP may is outside or is not included in the distribution system network with the first AP. The first AP may inform the controller of the discovered existing operating frequency channel of the at least one new AP, and the controller may provide or assign a new operating frequency channel to the first AP based on the following rule: First, the new operating frequency channel in the first AP may not overlap with the existing operating frequency channel of the at least one new AP. If the overlapping between the new operating frequency channel of the first AP and the existing operating frequency channel of the at least one new AP is not possible, then a primary channel of the new operating frequency channel may be selected to overlap with a secondary 80 MHz of the at least one new AP. In an implementation, if the overlapping with the secondary 80 MHz is not possible, then the primary channel of the new operating frequency channel may be selected to overlap with a secondary 40 MHz or the secondary 80 MHz of the at least one new AP. Similarly, if the overlapping with the secondary 40 MHz or the secondary 80 MHz is not possible, then the primary channel of the new operating frequency channel may be configured to overlap with a secondary 20 MHz of the at least one new AP. In the above rule, the at least one new AP is taken as a reference existing network for the assignment of the new operating frequency channel by the controller to the first AP.

In another implementation, such as in a non-distribution system network, the AP (e.g., first AP) by itself may implement the channel selection algorithm and adopts the same rule as described above. For example, the first AP may discover existing operating frequency channels of other APs that are within radio range when the first AP is newly powered on. In this example, the first AP may provide for itself the new operating frequency channel based on the rule as described above.

In an implementation, the secondary 80 MHz of the existing operating frequency channels may be assumed in the channel selection algorithm to include a statistically lesser traffic load as compared to the secondary 40 MHz. Similarly, the secondary 40 MHz may be assumed to include a statistically lesser traffic load as compared to the secondary 20 MHz in the existing operating frequency channels. In other words, if the overlapping between the new operating frequency channel and the existing operating frequency channel cannot be avoided, then the primary channel of the new operating frequency channel is selected to overlap first with the secondary 80 MHz. If this is not possible, then the primary channel of the new operating frequency channel is selected to overlap with the secondary 40 MHz or the secondary 20 MHz. In an implementation, the overlapping of the primary channel in the new operating frequency channel with the secondary 20 MHz of the existing operating frequency channel may be avoided if possible. In these implementations, the terms related to primary channel and secondary channel may be interpreted as described in the IEEE 802.11ac standard.

FIG. 1 illustrates an exemplary system 100 that uses or adopts IEEE 802.11ac standard. For example, the system 100 may include a distribution system network that implements the channel selection algorithm to minimize impact on existing networks. In an implementation, a BSS 102-1 may include a first access point (AP) 104-1 that serves or controls STAs 106 (e.g., STAs 106-1 and 106-2). In this implementation, the AP 104-1 may be assigned an operating frequency channel 108-1. The BSS 102-1 may include a large coverage area such as a cellular network, or a small coverage area such as a commercial building or a house. The STAs 106 may include a laptop, personal digital assistants (PDA), a mobile device, and the like. Furthermore, the STAs 106 may be understood to include other devices. FIG. 1 describes the system 100 for illustration purposes only; however, greater number of BSSs and STAs 106 may be included in an embodiment.

In an implementation, the AP 104-1 may include devices that allow wireless associated STAs 106 to communicate with other links such as other STAs 106 (e.g., STAs 106-3 and 106-4) of another AP 104-2. In this implementation, the AP 104-2 may be assigned an operating frequency channel 108-2. The operating frequency channels 108-1 and 108-2 may include primary channels (not shown) and secondary channels (not shown). Furthermore, the operating frequency channels 108-1 and 108-2 may be assigned by a controller 110 that runs a centralized channel assignment algorithm and assigns all operating frequency channels 108 to the APs 104 that are included in the distribution system network. In an implementation, new APs 104 (e.g., APs 104-3 and 104-4) may come within radio range of the AP 104-1, and the AP 104-1 may discover existing operating frequency channels (e.g., operating frequency channels 108-3 and 108-4 for the APs 104-3 and 104-4, respectively) of the other APs 104. In this implementation, the AP 104-1 may inform the controller 110 of the discovered operating frequency channels 108-3 and 108-4, and the controller 110 may assign a new operating frequency channel 108-1 to the AP 104-1 to avoid impacting the existing network such as the APs 104-3 and 104-4 in the current implementation. The assignment of the new operating frequency channel 108-1 may be based on a rule as further described below.

Figure 2:
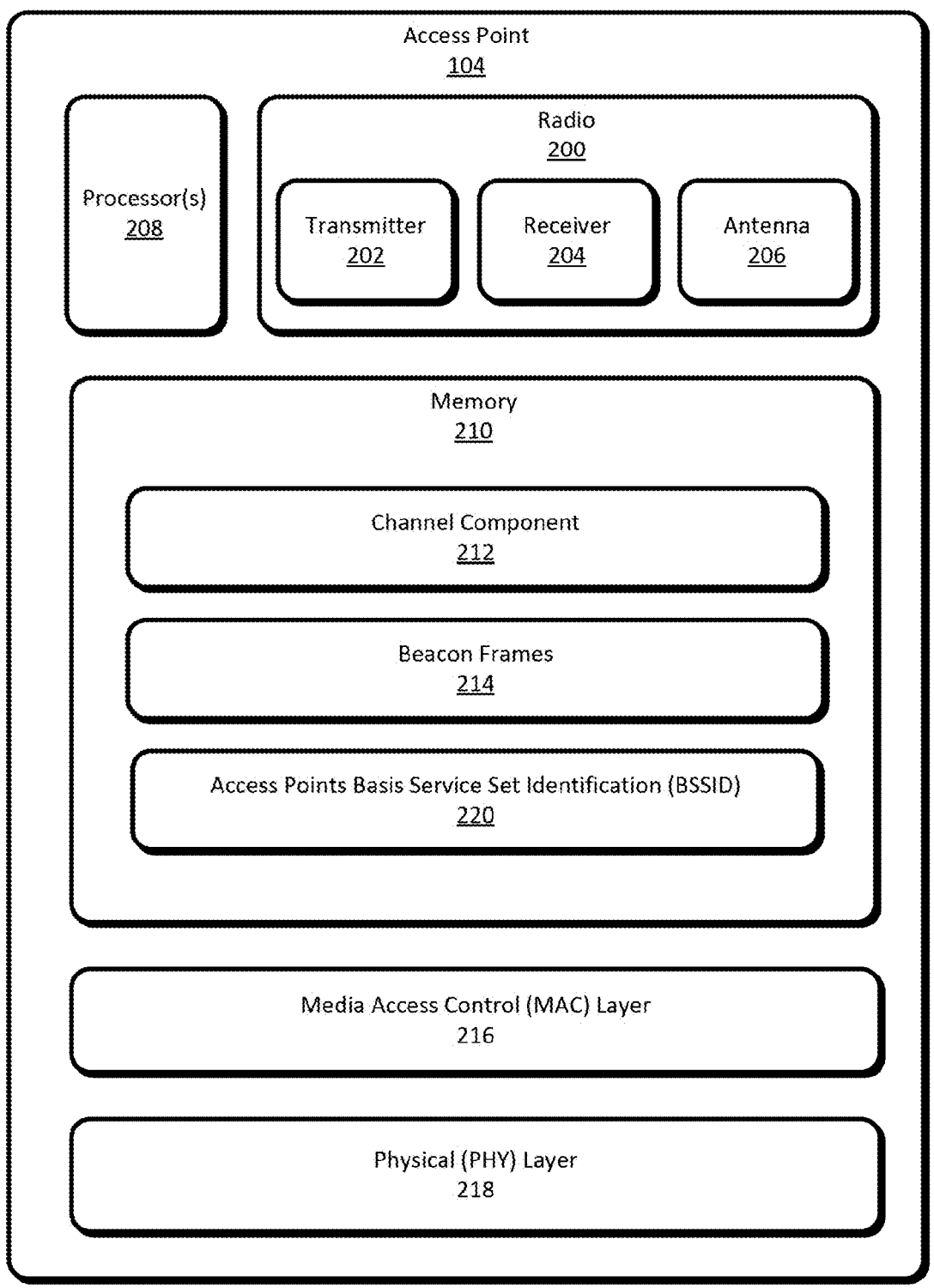
FIG. 2 illustrates an example access point (AP).

In an implementation, collaboration between the AP's 104 may be implemented through a wireless connection 114. For example, in a non-distribution system network (i.e., the operating frequency channels 108 are not assigned by the controller 110), a newly powered-on AP 104 (e.g., AP 104-1) may discover the existing operating frequency channels of the other APs 104 (e.g., AP 104-2, AP 104-3, and/or AP 104-4). In this example, the AP 104-1 by itself may perform the channel selection algorithm in providing its own new operating frequency 108-1. Similar to the assignment of the new operating frequency channel 108-1 by the controller 110, the AP 104-1 may assign or provide the new operating frequency 108-1 after observing the same rule as mentioned above for the distribution system network implementation FIG. 2 is an example implementation of the AP 104. The AP 104 may include a radio 200 that includes a receiver 202, a transmitter 204, and one or more antenna 206 for data transmission.

The AP 104 includes one or more processor(s) 208. Processor(s) 208 may be a single processing unit or a number of processing units, all of which may include single or multiple computing units or multiple cores. The processor 208 may be implemented as one or more microprocessors, microcomputers, microcontrollers, digital signal processors, central processing units, state machines, logic circuitries, and/or any devices that manipulate signals based on operational instructions. Among other capabilities, the processor 208 may be configured to fetch and execute computer-readable instructions or processor-accessible instructions stored in a memory 210 or other computer-readable storage media.

Due to high bandwidth requirements during data transmission, the AP 104 may be configured to operate at 80 MHz channel and/or 80+80/160 MHz channel (optional). These frequency channels (i.e., 80 MHz channel and 80+80/160 MHz channel) supplement the use of mixed 20 MHz and 40 MHz channels for low bandwidth data transmission. In an implementation, a channel component 212 may discover existing operating frequency channels that include primary channels and secondary channels (not shown) of the other APs 104 (i.e., existing networks) when the AP 104 is first turned on or the AP 104 comes within radio range of the other APs 104. The discovery of the operating frequency channels may be a continuous process, where each AP 104 monitors its channels for bad interference. Each AP 104 observes its environment in choosing its channels. This monitoring of interference may result in the AP 104 choosing to select a new operating frequency channel (e.g., operating frequency channel 108-1). In this implementation, the discovery of the primary and secondary channel locations in the existing networks (e.g., AP 104-3) may be used by the channel component 212 for proper selection of the operating frequency channel 108-1 during data transmission (e.g., using radio 200 above). The proper selection of the operating frequency channel 108-1 may follow a process to avoid impacting the existing networks. In another implementation, the operating frequency channel 108-1 may be assigned by the controller 110 in the distribution system network. For example, the controller 110 may perform the discovery of other existing networks—through the AP 104—before assigning or providing the operating frequency channel 108-1 to the AP 104-1. The discovering operation by the controller 110 is a part of the channel selection algorithm to avoid impacting the existing networks in the distribution system network.

In an implementation, the AP 104 may receive—through the receiver 202—an association request frame from the STA (e.g., STA 106-1) that intends to associate with the AP 104. In response to the association request frame from the STA 106-1, the AP 104 transmits an association response frame through the transmitter 204. In an implementation, the association response frame may include selected operating frequency channel 108-1 that may be used by the STAs 106. In an implementation, the AP 104 may include other blocks and components such as beacon frames 214 that may contain information about the AP 104, a Media Access Controller (MAC) 216 to implement media access control, and a physical layer or PHY layer 218 to provide electrical or mechanical interface to the transmission medium. In an implementation, the memory 210 may include an access point BSS Identification (BSSID) 220 that identifies the AP (e.g., AP 104-1). For example, the BSSID 220 may include bit identifier that uniquely identifies the AP (e.g., AP 104-1). The AP (e.g., AP 104-1) identification may be obtained by the STAs 106-1 and 106-2 that are associated with the AP (e.g., AP 104-1) in the BSS (e.g., BSS 102-1). In another implementation, the BSSID 220 may include the BSSIDs of the other APs (e.g., APs 104-2 to 104-N).

In certain implementations, the memory component 210 is an example of computer-readable storage media for storing instructions which are executed by the processor(s) 208 to perform the various functions described above. For example, memory 210 may generally include both volatile memory and non-volatile memory (e.g., RAM, ROM, or the like). Memory 210 may be referred to as memory or computer-readable storage media herein. Memory 210 is capable of storing computer-readable, processor-executable program instructions as computer program code that may be executed by the processor(s) 210 as a particular machine configured for carrying out the operations and functions described in the implementations herein.

Generally, any of the functions described with reference to the figures can be implemented using software, hardware (e.g., fixed logic circuitry) or a combination of these implementations. Program code may be stored in one or more computer-readable memory devices or other computer-readable storage devices. Thus, the processes and components described herein may be implemented by a computer program product. As mentioned above, computer storage media includes volatile and non-volatile, removable and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device.

Figure 3:
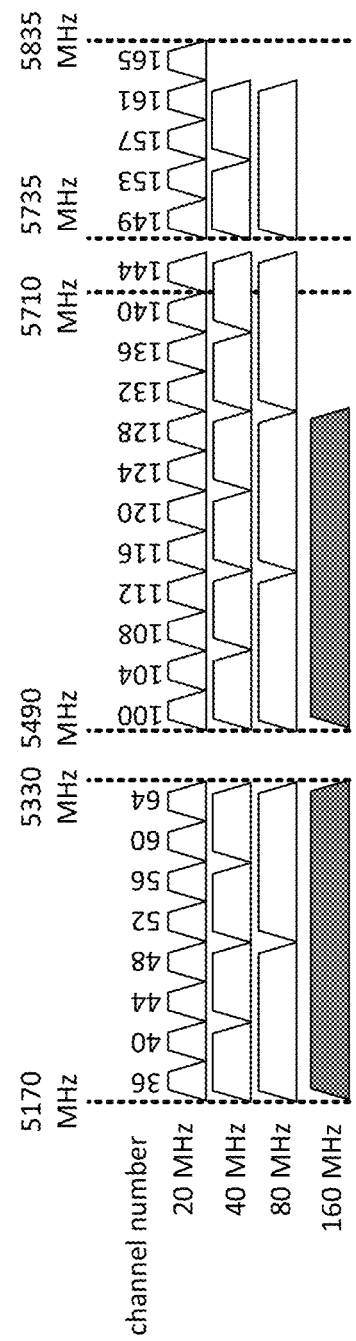
FIG. 3 illustrates an Institute of Electrical and Electronics Engineers or IEEE 802.11ac channels.

FIG. 3 illustrates an example IEEE 802.11ac channels. In an implementation, a 20 MHz, 40 MHz, 80 MHz, and 160 MHz channel allocations may define a portion of frequency spectrum that the AP 104 uses for transmitting and receiving data. The range of available channels for the AP 104 may be defined by radio mode and country code setting. Each radio mode offers a number of channels, depending on how the spectrum is licensed by national and transnational authorities such as the Federal Communications Commission (FCC) or the International Telecommunication Union (ITU-R).

In an implementation such as, in a 40 MHz operating frequency channel (e.g., operating frequency channel 108-1), the primary 20 MHz and a secondary 20 MHz may be included in the operating frequency channel 108-1. For example, the primary 20 MHz in channel 36 and adjacent secondary 20 MHz in channel 40 may be used as the 40 MHz operating frequency channel.

In an implementation such as, in 80 MHz operating frequency channel 108-1, the primary 20 MHz, the secondary 20 MHz, and another secondary 40 MHz may be used in the operating frequency channel 108-1. For example, the primary 20 MHz in channel 36, the secondary 20 MHz in channel 40, and the secondary 40 MHz in channels 44 and 48 may be used as the 80 MHz operating frequency channel 108-1. In this implementation, the primary 20 MHz, the secondary 20 MHz, and the secondary 40 MHz are contiguous with one another.

In an implementation such as, in the 160 MHz operating frequency channel 108-1, the 160 MHz operating frequency channel 108-1 may use a single 160 MHz channel of the frequency spectrum. For example, the single 160 MHz channel in channels 36 to 64 may be used as the 160 MHz operating frequency channel 108-1. In another example, the single 160 MHz channel may use the single 160 MHz channel in channel numbers 100 to 128.

Figure 4:
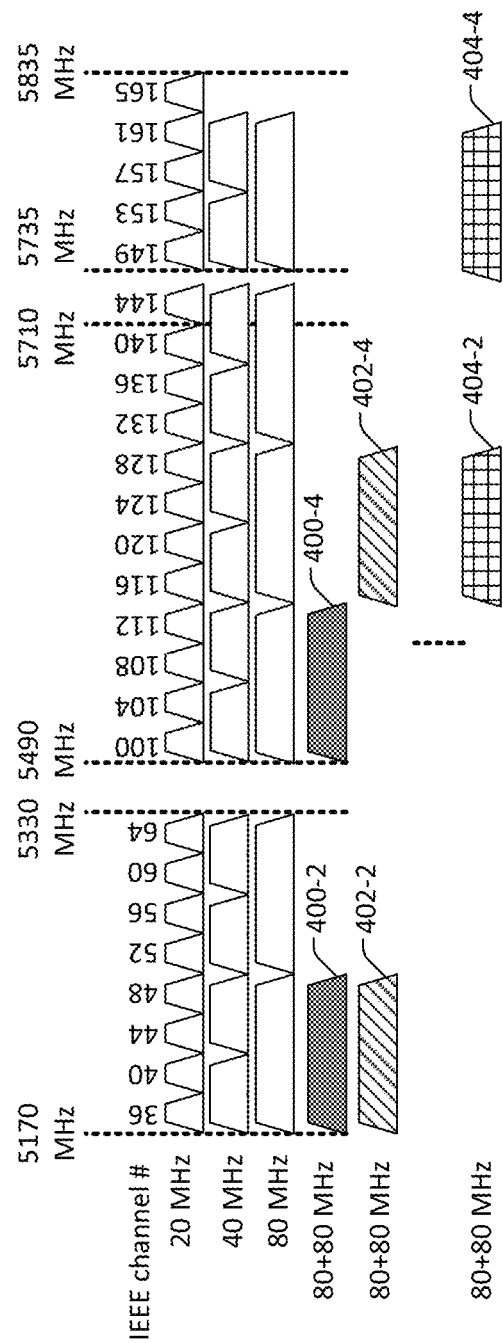
FIG. 4 illustrates an example very high throughput (VHT) 80+80/160 MHz channel allocation setup for Institute of Electrical and Electronics Engineers or IEEE 802.11ac channels.

FIG. 4 illustrates an example very high throughput (VHT) 80+80/160 MHz channel allocation setup for the IEEE 802.11ac. In an implementation, 80 MHz channels 400-2 and 400-4 may be adjacent to each other, or be separated along the frequency spectrum to allow the 160 MHz or 80+80 MHz operation (i.e., operating frequency channel 108-1) for the AP 104. For example, the 80 MHz channels 400-2 in channel numbers 36-48 and the other 80 MHz channels 400-4 in channel numbers 100-112 may be used in the 160 MHz or 80+80 MHz operation. In this example, either of the 80 MHz channels 400-2 or the 80 MHz channels 400-4 may be the primary channel for the 160 MHz channel allocation set up. In other implementations, 80 MHz channels 402 and 404 may similarly be separated or located adjacent to each other when using the 160 MHz channel allocation set up.

Figure 5A:
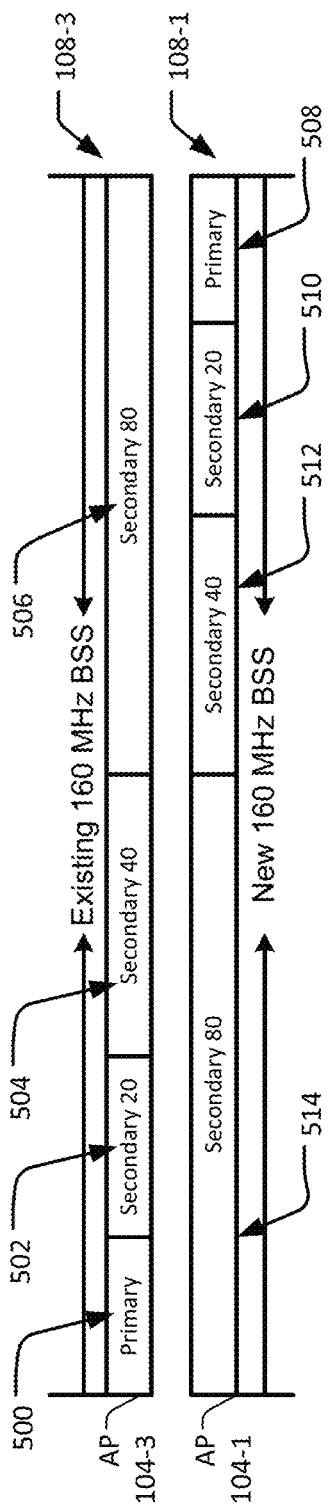
FIG. 5A illustrates an example channel selection for a new operating frequency channel location.

FIG. 5A illustrates an example channel selection for a new operating frequency channel. For example, an existing AP 104 (e.g., AP 104-3 as existing network) may operate at existing operating frequency channel 108-3 that includes a primary 20 MHz 500, a secondary 20 MHz 502, a secondary 40 MHz 504, and a secondary 80 MHz 506. In this example, the new operating frequency channel 108-1 for the AP 104-1 may be assigned or provided by the controller 110 if the AP 104-1 is included in the distribution system network. Otherwise, the AP 104-1 by itself may provide the new operating frequency channel 108-1 in a non-distribution system network. In an implementation, the assignment or the providing of the new operating frequency channel 108-1 by the controller 110 or by the AP 104-1 itself may follow the following rules:

First, the new operating frequency 108-1 is selected to avoid overlapping with the existing operating frequency channel 108-3;

Second, if the above first condition is not possible, then the primary channel of the new operating frequency channel 108-1 is selected to overlap with the secondary 80 MHz 508 of the AP 104-3;

Third, if the second condition above is not possible, then the primary channel of the new operating frequency 108-1 is selected to overlap with the secondary 40 MHz 506 or the secondary 80 MHz 508 of the AP 104-3; and Fourth, if the third condition above is not possible, then the primary channel of the new operating frequency 108-1 is selected to overlap with the secondary 20 MHz 504 or the secondary channels of the AP 104-3. With continuing reference to FIG. 5A, the new operating frequency channel 108-1 for the AP 104-1 may be selected to avoid overlapping with the primary channel 502, secondary 20 MHz 504, secondary 40 MHz 506, or the secondary 80 MHz 508 of the AP 104-3 as the reference existing network. Since this condition is not possible, then following the second and third steps/conditions as discussed above, a primary channel 508 of the new operating frequency channel 108-1 may be selected to overlap with the secondary 80 MHz 508 of the AP 104-3. In an implementation, the secondary 80 MHz 508 may be assumed to include a statistically lighter traffic load as compared to the secondary 40 MHz 506, or the secondary 20 MHz 504 of the AP 104-3. Similarly, the primary channel 500 may be assumed to carry a statistically heavier traffic load as compared to the secondary channels. Accordingly, the selection of the primary channel 508 of the new operating frequency channel 108-1, which includes secondary 20 MHz 510, 40 MHz 512 and 80 MHz 514, may minimize impact on the existing network (i.e., AP 104-3).

Figure 5B:
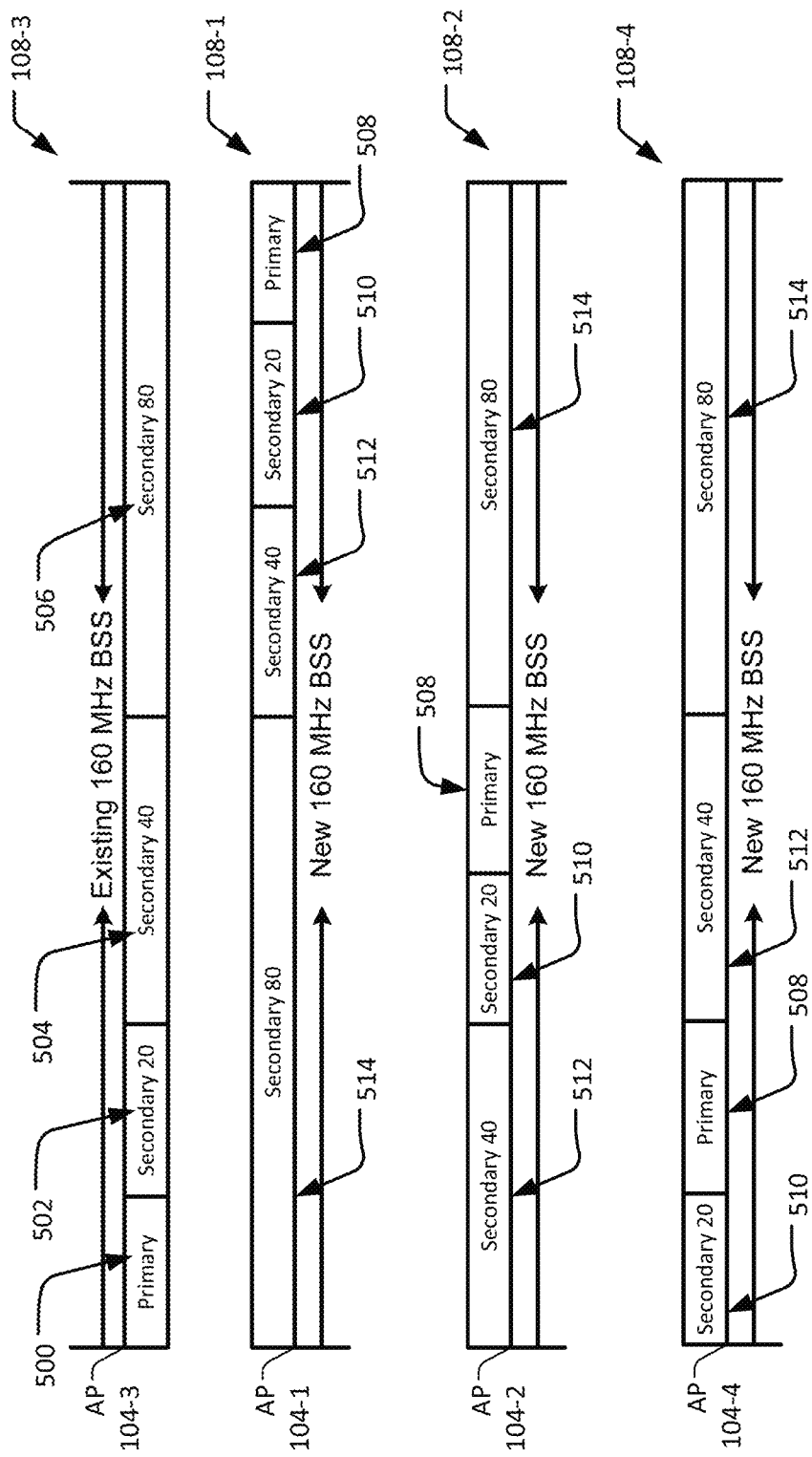
FIG. 5B illustrates an example channel selection for a new operating frequency channel location.

FIG. 5B illustrates another example channel selection for the new operating frequency channels. For example, the existing AP 104-3 may operate on the existing operating frequency channel 108-3 that includes the primary 20 MHz 500, the secondary 20 MHz 502, the secondary 40 MHz 504, and the secondary 80 MHz 506. In this example, APs 104-1, 104-2, 104-4 and 104-5 may provide or assign by themselves the new operating frequency channels 108-1, 108-2, 108-4 and 108-5, respectively, based on the rule described above. Particularly, the AP 104-1 may discover the existing operating frequency channel 108-3 and select the new operating frequency channel 108-1 to avoid overlapping with the existing operating frequency channel 108-3. If this is not possible, then the AP 104-1 may select its primary channel 508 to overlap the secondary 80 MHz 506 of the existing operating frequency channel 108-3. In another implementation, the AP 104-2 may discover the existing operating frequency channels 108-3 and 108-1, and may assign by itself the new operating frequency channel 108-2 that includes the primary channel 508 to overlap the secondary 40 MHz 512 and the secondary 80 MHz 506 of the existing operating frequency channels 108-1 and 108-3, respectively. In another implementation, the AP 104-4 may discover the existing operating frequency channels 108-2, 108-1, and 108-3, and may assign by itself the new operating frequency channel 108-4 that includes the primary channel 508 to overlap the secondary 80 MHz 514, secondary 40 MHz 512, and secondary 40 MHz 504 of the existing operating frequency channels 108-2, 108-1, and 108-3, respectively. In another implementation, the AP 104-5 may discover the existing operating frequency channels 108-4, 108-2, 108-1, and 108-3, and may assign by itself the new operating frequency channel 108-5 that includes the primary channel 508 to overlap the secondary 40 MHz 512, secondary 80 MHz 514, secondary 80 MHz 514, and secondary 20 MHz 502 of the existing operating frequency channels 108-4, 108-2, 108-1, and 108-3, respectively. In the latter implementation, the selection of the primary channel 508 to overlap with the secondary 20 MHz 502 of the existing operating frequency channel 108-3 may be avoided because of the assumed statistically heavier traffic load in the secondary 20 MHz 502 as compared to the secondary 40 MHz 504 or the secondary 80 MHz 506 of the existing operating frequency channel 108-3.

In an implementation, such as in the distribution system network, the controller 110 may assign or select the new operating frequency channels 108-1, 108-2, 108-4 and 108-5 based on the existing operating frequency channel 108-3 of the AP 104-3. In this implementation, the AP 104-3 is a new AP 104 with existing operating frequency channel 108-3 that is discovered by any of the other APs 104 in the distribution system network. For example, the AP 104-1 may discover the existing operating frequency channel 108-3 and informs the controller 110 of this discovery. In this example, the controller 110 may perform the centralized channel assignment algorithm and assigns the new operating frequency channels 108-1, 108-2, 108-4 and 108-5 to the APs 104-1, 104-2, 104-4 and 104-5, respectively. The assignment of the new operating frequency channels 108-1, 108-2, 108-4 and 108-5 may follow the rule as described above.

Figure 6:
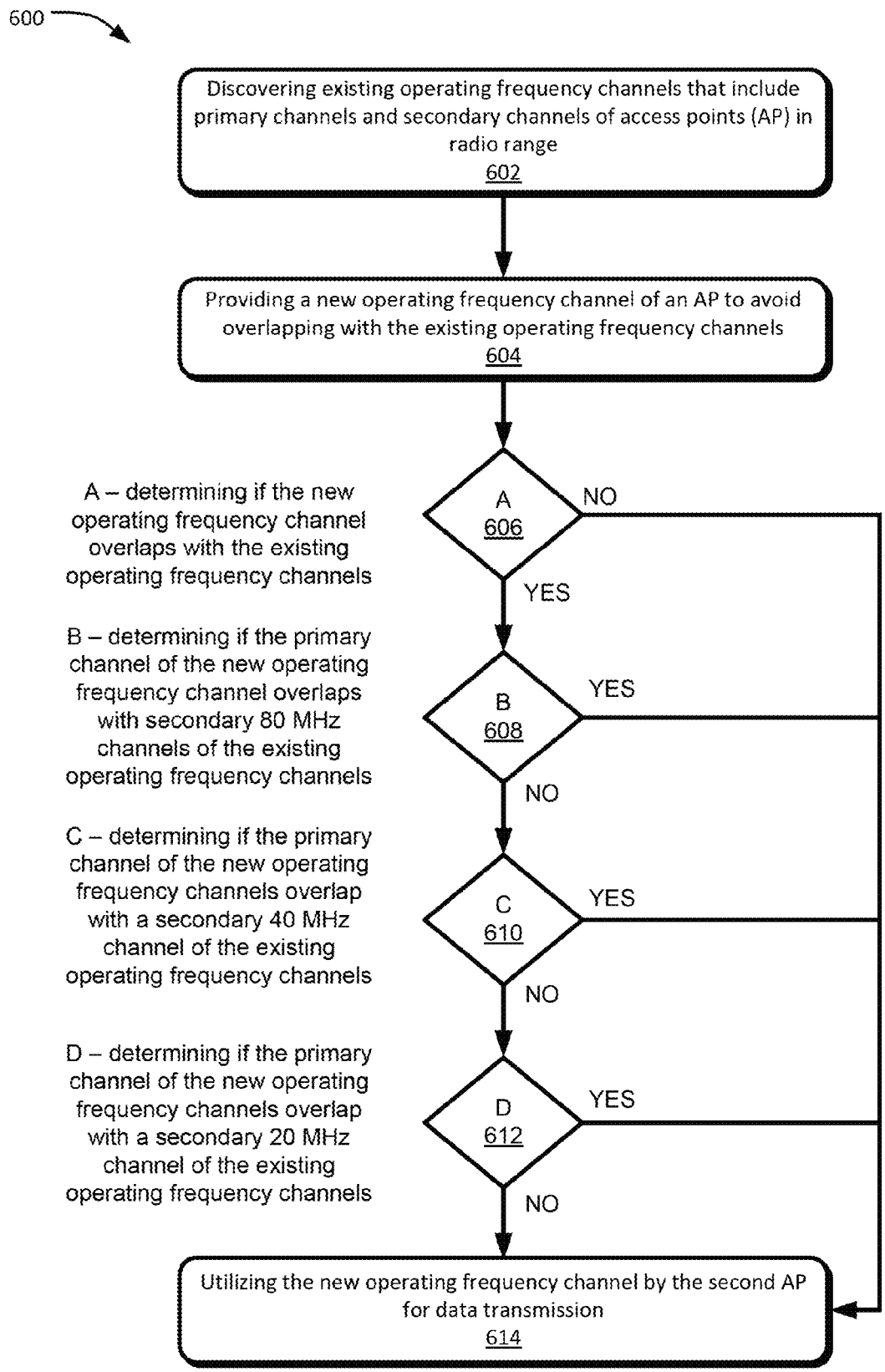
FIG. 6 illustrates an example method for channel selection by a controller or an access point.

FIG. 6 shows an example process flowchart 600 illustrating an example method for implementing channel selection algorithm to avoid impact on existing systems. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 602, discovering existing operating frequency channels to include primary channels and secondary channels of APs in radio range is performed. In an implementation, an AP (e.g., AP 104-1) may discover the existing operating frequency channels of the other APs (e.g., AP 104-3) that are in radio range with the AP 104-1. For example, the AP 104-1 in the distribution system may discover the existing operating frequency channel of the AP 104-3 that is not included in the distribution system network. In another example, such as in non-distribution system network, the AP 104-1 may discover the existing operating frequency channel of the AP 104-3 that comes within radio range of the AP 104-1 when the AP 104-1 is newly powered on.

At block 604, providing a new operating frequency channel to avoid overlapping with the existing operating frequency channels is performed. In an implementation, such as in the distribution system network, the AP 104-1 may inform a controller (e.g., controller 110) of the discovered existing operating frequency channel of the AP 104-3 that is not included in the distribution system network. In this implementation, the controller 110 may provide the new operating frequency channel to the AP 104-1 that may not overlap with the existing operating frequency channel of the AP 104-3. In another implementation, such as in the non-distribution system network, the AP 104-1 by itself may provide the new operating frequency channel that may not overlap with the existing operating frequency channel of the AP 104-3 when the AP 104-1 is newly powered on. For example, the AP 104-1 through a channel component (e.g., channel component 212) may discover the existing operating frequency channel of the AP 104-3 when the AP 104-1 is newly powered on.

At block 606, determining if the new operating frequency channel overlaps with the existing operating frequency channels is performed. In an implementation, if the new operating frequency channel for the AP 104-1 overlaps with the existing operating frequency channel of the AP 104-3 (i.e., overlaps with any of the primary channel 500, or the secondary 20 MHz 502, 40 MHz 504, or 80 MHz 506), then at YES block 608, determining if the primary channel (e.g. primary channel 508) of the new operating frequency channel overlaps only with the secondary 80 MHz 508 of the existing operating frequency channel of the AP 104-3 is performed. Otherwise, at NO block 614, utilizing the new operating frequency channel by the AP 104-1 for data transmission is performed.

At block 608, determining if the primary channel of the new operating frequency channel 108-1 overlaps with the secondary 80 MHz 506 of the existing operating frequency channels is performed. In an implementation, if the primary channel 508 of the new operating frequency channel 108-1 overlaps with the secondary 80 MHz 506 of the AP 104-3, then at YES block 614, utilizing the new operating frequency channel 108-1 by the AP 104-1 for data transmission is performed. Otherwise, at NO block 610, determining if the primary channel 508 of the new operating frequency channel 108-1 overlaps only with the secondary channel 40 MHz 504 or the secondary 80 MHz 506 of the AP 104-3 is performed.

At block 610, determining if the primary channel of the new operating frequency channel 108-1 overlaps with the secondary 40 MHz 504 or the secondary 80 MHz 506 of the existing operating frequency channels is performed. In an implementation, if the primary channel 508 of the new operating frequency channel 108-1 overlaps with the secondary channel 40 MHz 504 or the secondary 80 MHz 506 of the existing operating frequency channel 108-3, then at YES block 614, utilizing the new operating frequency channel 108-1 by the AP 104-1 for data transmission is performed. Otherwise, at NO block 612, determining if the primary channel 508 of the new operating frequency channel 108-1 overlaps with the secondary channels (i.e., secondary 20 MHz 502, secondary channel 40 MHz 504, or secondary 80 MHz 506) of the existing operating frequency channel 108-3 is performed.

At block 612, determining if the primary channel of the new operating frequency channel 108-1 overlaps with the secondary channels of the existing operating frequency channels is performed. In an implementation, if the primary channel 508 of the new operating frequency channel 108-1 overlaps with the secondary channels of the existing operating frequency channel 108-3, then at YES block 614, utilizing the new operating frequency channel 108-1 by the AP 104-1 for data transmission is performed. Otherwise, the primary channel 508 of the new operating frequency channel 108-1 may be assumed to overlap with the primary channel 500 of the existing operating frequency channel 108-3. To this end, following NO block at block 614, the new operating frequency channel 108-1 may still be used by the AP 104-1 for data transmission. In an implementation, the overlapping of the primary channel 508 of the new operating frequency channel 108-1 with the secondary 20 MHz 502 or the primary channel 500 of the existing operating frequency channel 108-3 may be avoided to mitigate impacting the existing network.

In an implementation, the secondary 80 MHz 506 of the existing operating frequency channels 108-3 may be assumed to include a statistically lesser traffic load as compared to the secondary 40 MHz 504. Similarly, the secondary 20 MHz 502 may be assumed to include a statistically lesser traffic load as compared to the secondary 40 MHz 504. In other words, the primary channel 500 in the existing operating frequency channel 108-3 may be assumed to include a heavier traffic load as compared to the secondary 20 MHz 502, or the secondary 40 MHz 504, or the secondary 80 MHz 506.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

Figure 7:
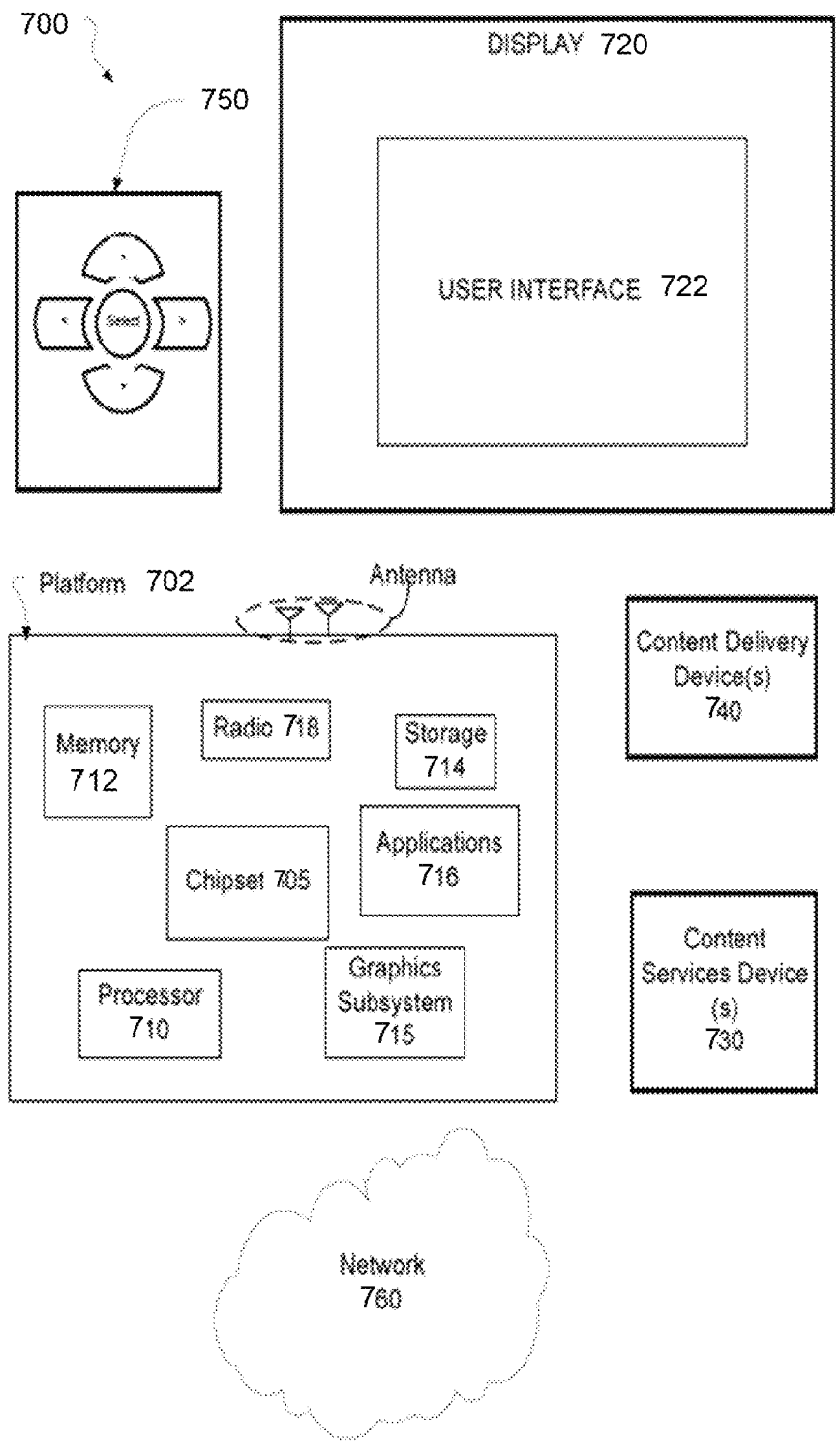
FIG. 7 is an illustrative diagram of an example system.

FIG. 7 illustrates another example system 700 in accordance with the present disclosure. In various implementations, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 700 includes a platform 702 coupled to a display 720. Platform 702 may receive content from a content device such as content services device(s) 730 or content delivery device(s) 740 or other similar content sources. A navigation controller 750 including one or more navigation features may be used to interact with, for example, platform 702 and/or display 720. Each of these components is described in greater detail below.

In various implementations, platform 702 may include any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 710 may be dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 714 may include technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 may be integrated into processor 710 or chipset 705. In some implementations, graphics subsystem 715 may be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 718 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In various implementations, display 720 may include any television type monitor or display. Display 720 may include, for example, a computer display screen, touch screen display, video monitor, television-like device, and/or a television. Display 720 may be digital and/or analog. In various implementations, display 720 may be a holographic display. In various implementations, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In various implementations, content services device(s) 730 may include a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

In various implementations, drivers (not shown) may include technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 even when the platform is turned "off." In addition, chipset 705 may include hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the present disclosure.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 7.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

The following examples pertain to further embodiments. A method of channel selection algorithm comprising: discovering by a first access point (AP) of existing operating frequency channels to include primary channels and secondary channels of other APs; providing a new operating frequency channel to the first AP to avoid overlapping with the existing operating frequency channels of the other APs, wherein if the overlapping between the new operating frequency channel and the existing operating frequency channels is not possible, then the primary channel of the new operating frequency channel is selected to overlap with a secondary 80 MHz of the other APs, wherein if the overlapping with the secondary 80 MHz of the other APs is not possible, then the primary channel of the new operating frequency channel is configured to overlap with secondary 40 MHz or secondary 80 MHz of the other APs, wherein if the overlapping with the secondary 40 MHz or the secondary 80 MHz of the other APs is not possible, then the primary channel of the new operating frequency channel is configured to overlap with the secondary channels of the other APs, wherein if the overlapping with the secondary channels of the other APs is not possible, then the second operating frequency channel is configured to overlap with the primary channel of the other APs; and utilizing the new operating frequency channel by the first AP.

In certain implementations, wherein the discovering by the first AP of the existing operating frequency channels is utilized by a controller in a distribution system network to perform the channel selection algorithm in providing the new operating frequency channel to the first AP.

In certain implementations, wherein the discovering by the first AP of the existing operating frequency channels is utilized by the first AP itself in providing the new operating frequency channel in a non-distribution system network.

In certain implementations, wherein the providing a new operating frequency channel to avoid overlapping with the existing operating frequency channels is a priority over the selecting of the primary channel of the new operating frequency channel to overlap with the secondary channels of the other APs.

In certain implementations, wherein the selecting the primary channel of the new operating frequency to overlap with the secondary 80 MHz of the other APs is a priority over selecting the primary channel of the new operating frequency to overlap with the secondary 40 MHz of the other APs, wherein the selecting the primary channel of the new operating frequency to overlap with the secondary 40 MHz or the secondary 80 MHz of the other APs is a priority over selecting the primary channel of the new operating frequency channel to overlap with the secondary 20 MHz of the other APs.

In certain implementations, wherein the secondary 80 MHz of the other APs is assumed to include a statistically lighter traffic load as compared to the secondary 40 MHz or the secondary 20 MHz of the other APs when implementing the channel selection algorithm.

In certain implementations, wherein the first AP discovers the existing frequency channels of the other APs when the first AP is newly powered on.

In certain implementations, wherein the first AP or the other APs operate at 80 MHz channel or 160 MHz channel, wherein the 80 MHz channel includes two adjacent 40 MHz channel while the 160 MHz channel includes two adjacent or separate 80 MHz channel.

In certain implementations, wherein the new operating frequency channel is a 80 MHz channel that includes the primary channel, the secondary 20 MHz, and the secondary 40 MHz, which are contiguous with one another.

In certain implementations, wherein the others APs are treated as reference existing networks for providing the new operating frequency channel to the first AP.

In certain implementations, a device comprising: one or more processors; memory accessed by the processors; an access point (AP) accessed by the processors comprising: a channel component configured to discover existing operating frequency channels of other APs that come within radio range of the AP, wherein the channel component provides a new operating frequency channel to avoid overlapping with the existing operating frequency channels of the other APs, wherein if the overlapping between the new operating frequency channel and the existing operating frequency channels cannot be avoided, then a primary channel of the new operating frequency channel is configured to overlap with secondary 80 MHz of the existing operating frequency channels of the other APs, wherein if the overlapping with the secondary 80 MHz is not possible, then the primary channel of the new operating frequency channel is configured to overlap with secondary 40 MHz or the secondary 80 MHz of the existing operating frequency channels of the other APs, wherein if the overlapping with the secondary 40 MHz or the secondary 80 MHz is not possible, then the frequency channel is configured to overlap with the secondary channels of the existing operating frequency channels of the other APs; and a radio component that uses the new frequency channel for data transmission.

In certain implementations, wherein the AP is provided with the new operating frequency channel by a controller in a distribution system network, wherein the controller performs a channel selection algorithm by utilizing locations of the primary channels and the secondary channels in the other APs.

In certain implementations, wherein the AP by itself provides the new operating frequency channel in a non-distribution system network when the AP is newly powered on or comes within the radio range of the other APs.

In certain implementations, wherein the avoiding of overlap between the new operating frequency channel of the AP and the existing operating frequency channels of the other APs is a first priority before the selecting of the primary channel in the new operating frequency channel of the AP to overlap with the secondary channels of the other APs.

In certain implementations, wherein the AP operates at 160 MHz channel allocation that includes two adjacent or separate 80 MHz channels.

In certain implementations, wherein the secondary channels of the other APs include statistically lighter load as compared to the primary channels.

In certain implementations, wherein the AP includes the primary channel to overlap with the secondary channels of the other APs, wherein the secondary 80 MHz of the other APs are assumed to include statistically lighter traffic load as compared to the secondary 40 MHz or secondary 20 MHz of the other APs.

In certain implementations, wherein the AP operates at 80 MHz channel that includes two adjacent 40 MHz channel.

In certain implementations, wherein the AP operates at 80 MHz channel to include the primary channel, the secondary 20 MHz, and the secondary 40 MHz, which are contiguous with one another In certain implementations, wherein the AP is included in a first basic service set (BSS) while the other APs are included in other BSSs.

In certain implementations, a first access point (AP) to perform channel selection comprising: a channel component configured to discover existing operating frequency channels of existing networks that come within radio range of the first AP, wherein the channel component provides a new operating frequency channel to avoid overlapping with the existing operating frequency channels of the existing networks, wherein if the overlapping between the new operating frequency channel and the existing operating frequency channels cannot be avoided, then a primary channel of the new operating frequency channel is configured to overlap with secondary 80 MHz of the existing operating frequency channels in the existing networks, wherein if the overlapping with the secondary 80 MHz is not possible, then the primary channel of the new operating frequency channel is configured to overlap with secondary 40 MHz or the secondary 80 MHz of the existing operating frequency channels in the existing networks, wherein if the overlapping with the secondary 40 MHz or the secondary 80 MHz is not possible, then the frequency channel is configured to overlap with secondary 20 MHz, or the secondary 40 MHz or the secondary 80 MHz of the existing operating frequency channels in the existing networks; and a radio component that uses the new operating frequency channel for data transmission.

In certain implementations, wherein the existing operating frequency channels include the primary channels and the secondary channels of other APs that come within radio range of the first AP.

In certain implementations, wherein the avoiding of overlap between the new operating frequency channel and the existing operating frequency channels is a first priority before the selection of the primary channel in the new operating frequency channel to overlap with the secondary channels of the existing operating frequency channels is implemented.

In certain implementations, wherein the first AP operates at 160 MHz channel allocation that includes two adjacent or separate 80 MHz channels.

In certain implementations, wherein the secondary 80 MHz of the other APs is assumed to include a statistically lighter traffic load as compared to the secondary 40 MHz or the secondary 20 MHz of the other APs when implementing the channel selection algorithm.

In certain implementations, wherein the first AP includes the new operating frequency channel that is assigned by a controller if the first AP belongs to a distribution system network.

In certain implementations, wherein the primary channels of the other existing networks are assumed to include statistically heavy traffic load as compared to the secondary 20 MHz of the other existing networks.

In certain implementations, wherein the first AP operates at 80 MHz channel that includes two adjacent 40 MHz channel.

In certain implementations, wherein the first AP operates at 80 MHz channel that includes the primary channel, the secondary 20 MHz, and the secondary 40 MHz, which are contiguous with one another In certain implementations, wherein the first AP is included in a first basic service set (BSS) while the existing network is included in a second BSS

What is claimed is:

1. A method of channel selection algorithm comprising:
   discovering by a first access point (AP) of existing operating frequency channels to include primary channels and secondary channels of other APs;
   providing a new operating frequency channel to the first AP to avoid overlapping with the existing operating frequency channels of the other APs, wherein when the overlapping between the new operating frequency channel and the existing operating frequency channels is not possible, then the primary channel of the new operating frequency channel is selected to overlap with a secondary 80 MHz of the other APs, wherein when the overlapping with the secondary 80 MHz of the other APs is not possible, then the primary channel of the new operating frequency channel is configured to overlap with secondary 40 MHz or secondary 80 MHz of the other APs, wherein when the overlapping with the secondary 40 MHz or the secondary 80 MHz of the other APs is not possible, then the primary channel of the new operating frequency channel is configured to overlap with the secondary channels of the other APs, wherein when the overlapping with the secondary channels of the other APs is not possible, then the second operating frequency channel is configured to overlap with the primary channel of the other APs; and
   utilizing the new operating frequency channel by the first AP.

2. The method of claim 1, wherein the discovering by the first AP of the existing operating frequency channels is utilized by a controller in a distribution system network to perform the channel selection algorithm in providing the new operating frequency channel to the first AP.

3. The method of claim 1, wherein the discovering by the first AP of the existing operating frequency channels is utilized by the first AP itself in providing the new operating frequency channel in a non-distribution system network.

4. The method of claim 1, wherein the providing a new operating frequency channel to avoid overlapping with the existing operating frequency channels is a priority over the selecting of the primary channel of the new operating frequency channel to overlap with the secondary channels of the other APs.

5. The method of claim 1, wherein the selecting the primary channel of the new operating frequency to overlap with the secondary 80 MHz of the other APs is a priority over selecting the primary channel of the new operating frequency to overlap with the secondary 40 MHz of the other APs, wherein the selecting the primary channel of the new operating frequency to overlap with the secondary 40 MHz or the secondary 80 MHz of the other APs is a priority over selecting the primary channel of the new operating frequency channel to overlap with the secondary 20 MHz of the other APs.

6. The method of claim 1, wherein the secondary 80 MHz of the other APs is assumed to include a statistically lighter traffic load as compared to the secondary 40 MHz or the secondary 20 MHz of the other APs when implementing the channel selection algorithm.

7. The method of claim 1, wherein the first AP discovers the existing frequency channels of the other APs when the first AP is newly powered on.

8. The method of claim 1, wherein the first AP or the other APs operate at 80 MHz channel or 160 MHz channel, wherein the 80 MHz channel includes two adjacent 40 MHz channel while the 160 MHz channel includes two adjacent or separate 80 MHz channel.

9. The method of claim 1, wherein the new operating frequency channel is a 80 MHz channel that includes the primary channel, the secondary 20 MHz, and the secondary 40 MHz, which are contiguous with one another.

10. The method of claim 1, wherein the others APs are treated as reference existing networks for providing the new operating frequency channel to the first AP.

11. A access point (AP) device comprising:
one or more processors;
memory accessed by the processors comprising;
a channel component configured to discover existing operating frequency channels of other APs that come within radio range of the AP device, wherein the channel component is configured to provide a new operating frequency channel to avoid overlapping with the existing operating frequency channels of the other AP devices, wherein when the overlapping between the new operating frequency channel and the existing operating frequency channels cannot be avoided, then a primary channel of the new operating frequency channel is configured to overlap with secondary 80 MHz of the existing operating frequency channels of the other AP devices, wherein when the overlapping with the secondary 80 MHz is not possible, then the primary channel of the new operating frequency channel is configured to overlap with secondary 40 MHz or the secondary 80 MHz of the existing operating frequency channels of the other AP devices, wherein when the overlapping with the secondary 40 MHz or the secondary 80 MHz is not possible, then the frequency channel is configured to overlap with the secondary channels of the existing operating frequency channels of the other AP devices; and
a radio component configured to use the new frequency channel for data transmission.

12. The access point (AP) device of claim 11, wherein the AP device is provided with the new operating frequency channel by a controller in a distribution system network, wherein the controller performs a channel selection algorithm by utilizing locations of the primary channels and the secondary channels in the other AP devices.

13. The access point (AP) device of claim 11, wherein the AP device by itself is configured to provide the new operating frequency channel in a non-distribution system network when the AP device is newly powered on or comes within the radio range of the other AP devices.

14. The access point (AP) device of claim 11, wherein the avoiding of overlap between the new operating frequency channel of the AP and the existing operating frequency channels of the other AP devices is a first priority before the selecting of the primary channel in the new operating frequency channel of the AP device to overlap with the secondary channels of the other AP devices.

15. The access point (AP) device of claim 11, wherein the AP device is configured to operate at 160 MHz channel allocation that includes two adjacent or separate 80 MHz channels.

16. The access point (AP) device of claim 11, wherein the secondary channels of the other AP devices include statistically lighter load as compared to the primary channels.

17. The access point (AP) device of claim 11, wherein the AP device includes the primary channel to overlap with the secondary channels of the other AP devices, wherein the secondary 80 MHz of the other AP devices are assumed to include statistically lighter traffic load as compared to the secondary 40 MHz or secondary 20 MHz of the other AP devices.

18. The access point (AP) device of claim 11, wherein the AP device is configured to operate at 80 MHz channel that includes two adjacent 40 MHz channel.

19. The access point (AP) device of claim 11, wherein the AP device is configured to operate at 80 MHz channel to include the primary channel, the secondary 20 MHz, and the secondary 40 MHz, which are contiguous with one another.

20. The access point (AP) device of claim 11, wherein the AP device is included in a first basic service set (BSS) while the other AP devices are included in other BSSs.

21. A first access point (AP) to perform channel selection comprising:
a channel component configured to memory accessed by one or more processors, to discover existing operating frequency channels of existing networks that come within radio range of the first AP, wherein the channel component is configured to provide a new operating frequency channel to avoid overlapping with the existing operating frequency channels of the existing networks, wherein when the overlapping between the new operating frequency channel and the existing operating frequency channels cannot be avoided, then a primary channel of the new operating frequency channel is configured to overlap with secondary 80 MHz of the existing operating frequency channels in the existing networks, wherein when the overlapping with the secondary 80 MHz is not possible, then the primary channel of the new operating frequency channel is configured to overlap with secondary 40 MHz or the secondary 80 MHz of the existing operating frequency channels in the existing networks, wherein when the overlapping with the secondary 40 MHz or the secondary 80 MHz is not possible, then the frequency channel is configured to overlap with secondary 20 MHz, or the secondary 40 MHz or the secondary 80 MHz of the existing operating frequency channels in the existing networks; and
a radio component configure to use the new operating frequency channel for data transmission.

22. The first AP of claim 21, wherein the existing operating frequency channels include the primary channels and the secondary channels of other APs that come within radio range of the first AP.

23. The first AP of claim 21, wherein the avoiding of overlap between the new operating frequency channel and the existing operating frequency channels is a first priority before the selection of the primary channel in the new operating frequency channel to overlap with the secondary channels of the existing operating frequency channels is implemented.

24. The first AP of claim 21, wherein the first AP is configured to operate at 160 MHz channel allocation that includes two adjacent or separate 80 MHz channels.

25. The first AP of claim 21, wherein the secondary 80 MHz of the other APs is assumed to include a statistically lighter traffic load as compared to the secondary 40 MHz or the secondary 20 MHz of the other APs when implementing the channel selection algorithm.

26. The first AP of claim 21, wherein the first AP includes the new operating frequency channel that is assigned by a controller if the first AP belongs to a distribution system network.

27. The first AP of claim 21, wherein the primary channels of the other existing networks are assumed to include statistically heavy traffic load as compared to the secondary 20 MHz of the other existing networks.

28. The first AP of claim 21, wherein the first AP is configured to operate at 80 MHz channel that includes two adjacent 40 MHz channel.

29. The first AP of any of claim 21, wherein the first AP is configured to operate at 80 MHz channel that includes the primary channel, the secondary 20 MHz, and the secondary 40 MHz, which are contiguous with one another.

30. The first AP of claim 21, wherein the first AP is included in a first basic service set (BSS) while the existing network is included in a second BSS.

* * * * *